(12) United States Patent
Shook et al.

(10) Patent No.: US 8,692,509 B2
(45) Date of Patent: Apr. 8, 2014

(54) CHARGE CONTROL SCHEME FOR USE IN POWER TOOLS

(75) Inventors: Christopher W. Shook, Bel Air, MD (US); Keith E. McQuaid, Baltimore, MD (US); Steven J. Phillips, Ellicott City, MD (US); Fugen Qin, Lutherville Timonium, MD (US); Lyle J. Matson, Shrewsbury, PA (US); Keith D Flaharty, Wrightsville, PA (US)

(73) Assignee: Black & Decker Inc., Newark, DE (US)

( * ) Notice: Subject to any disclaimer, the term of this patent is extended or adjusted under 35 U.S.C. 154(b) by 355 days.

(21) Appl. No.: 13/166,910

(22) Filed: Jun. 23, 2011

(65) Prior Publication Data
US 2012/0326670 A1 Dec. 27, 2012

(51) Int. Cl.
*H01M 10/46* (2006.01)

(52) U.S. Cl.
USPC .......................................................... 320/107

(58) Field of Classification Search
USPC .......... 320/107, 112, 114, 115, 128, 134, 136
See application file for complete search history.

(56) References Cited

U.S. PATENT DOCUMENTS

| | | | |
|---|---|---|---|
| 4,238,721 A | 12/1980 | DeLuca et al. | |
| 4,849,309 A | 7/1989 | Redey et al. | |
| 5,952,815 A | 9/1999 | Rouillard et al. | |
| 6,064,179 A | 5/2000 | Ito et al. | |
| 6,608,470 B1 | 8/2003 | Oglesbee et al. | |
| 7,081,737 B2 | 7/2006 | Liu et al. | |
| 7,825,629 B2 | 11/2010 | Studyvin et al. | |
| 2004/0113586 A1 | 6/2004 | Chen | |
| 2005/0221168 A1 | 10/2005 | Dahn et al. | |
| 2006/0214636 A1 | 9/2006 | Arai et al. | |
| 2007/0252553 A1* | 11/2007 | Mori et al. | 320/114 |
| 2008/0176608 A1 | 7/2008 | Budampati et al. | |
| 2009/0015207 A1 | 1/2009 | Ibrahim | |
| 2010/0026240 A1* | 2/2010 | Jiang et al. | 320/116 |
| 2010/0117593 A1 | 5/2010 | Piccard et al. | |
| 2010/0141207 A1* | 6/2010 | Phillips et al. | 320/114 |
| 2011/0294017 A1* | 12/2011 | Weng et al. | 429/338 |

* cited by examiner

*Primary Examiner* — Edward Tso
(74) *Attorney, Agent, or Firm* — Harness, Dickey & Pierce, P.L.C.

(57) ABSTRACT

A simplified control scheme is presented for use in a power tool. The power tool may be comprised of two or more lithium-ion battery cells connected in series and operable to drive the motor in the tool. A charging circuit is configured to receive a charging current from an AC adapter and to supply the charging current to the battery cells. A microcontroller monitors the voltage of the battery cells and terminates charging of the battery cells in accordance with the monitored voltages of the battery cells. The microcontroller does not receive power from the battery cells but is only powered by the AC adapter. Of note, each of the battery cells preferably employs an electrolyte composition comprised of a redox shuttle material. In combination with other tool components, the use of the redox shuttle material reduces or eliminates the need for expensive charge and discharge controls, thereby reducing the cost of the tool.

16 Claims, 5 Drawing Sheets

CHARGE CONTROL SCHEME FOR USE IN POWER TOOLS

FIELD

The present disclosure relates to a simplified charge control scheme for use in power tools.

BACKGROUND

Cordless products or devices which use rechargeable batteries are prevalent in the marketplace. Rechargeable batteries may be used in numerous devices ranging from computers to power tools. Since the devices use a plurality of battery cells, the battery cells are commonly packaged in a battery pack. The battery pack may in turn be used to power the devices when coupled thereto. Once depleted, the battery pack may be recharged by a battery charger.

Lithium based battery cells have emerged as the predominant chemistry for such rechargeable batteries. As compared to other battery chemistries, lithium battery cells are lighter and have a larger capacity per unit volume. On the other hand, lithium batteries may deteriorate rapidly when subjected to overcharging, over-discharging, overheating, or other adverse conditions. Therefore, these types of battery system typically employ extensive protective measures to prevent such adverse conditions. Unfortunately, these types of protective measures can also significantly increase product costs.

Therefore, it is desirable to develop a simplified charge and discharge control scheme for use in power tools as well as other types of device that employ rechargeable batteries having similar characteristics. This section provides background information related to the present disclosure which is not necessarily prior art.

SUMMARY

A simplified control scheme is presented for use in a power tool. The power tool may be comprised of two or more lithium-ion battery cells connected in series and operable to drive the motor in the tool. A charging circuit is configured to receive a charging current from an AC adapter and to supply the charging current to the battery cells. A microcontroller monitors the voltage of the battery cells and terminates charging of the battery cells in accordance with the monitored voltages of the battery cells. The microcontroller does not receive power from the battery cells but is only powered by the AC adapter. Of note, each of the battery cells preferably employs an electrolyte composition comprised of a redox shuttle material. In combination with other tool components, the use of the redox shuttle material reduces or eliminates the need for expensive charge and discharge controls, thereby reducing the cost of the tool.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
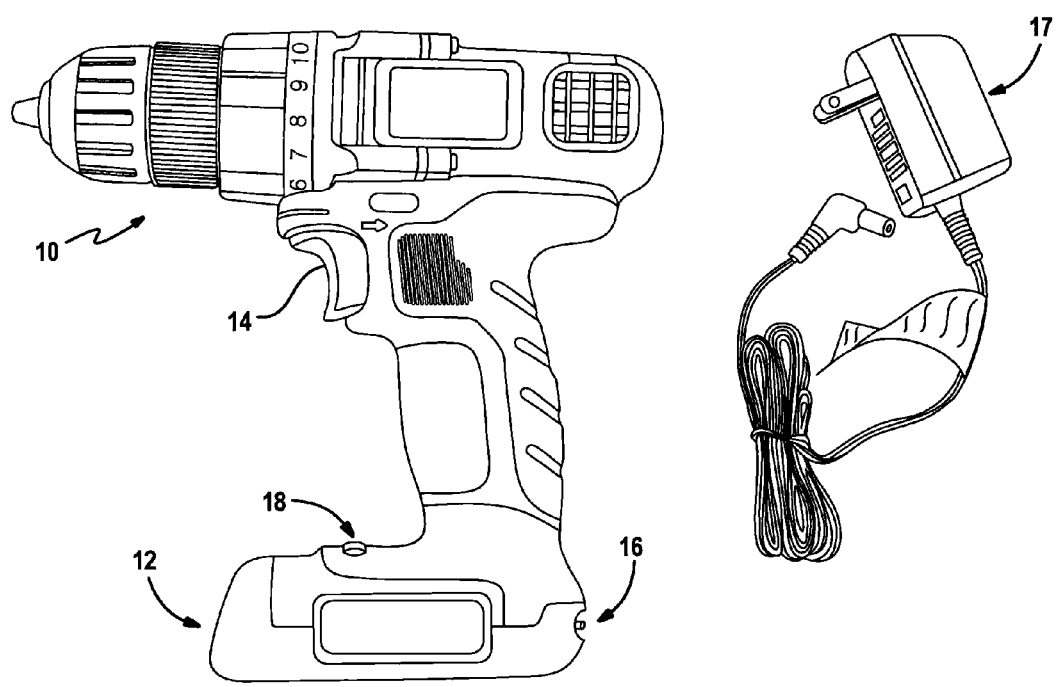
FIG. 1 is a diagram of an exemplary power tool and an associated AC adapter.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 illustrates an exemplary power tool 10 having an integral battery pack 12. In this example, the power tool is a hand held drill. While the battery pack is shown as integral with the tool, it is readily understood that the battery pack may be selectively coupled to the tool. Furthermore, it is understood that the broader aspects of the present disclosure are applicable to other types of power tools having a battery pack, such as hammer drill/drivers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers.

In general, the drill includes a spindle drivably coupled to an electric motor. A chuck is coupled at one end of the spindle; whereas a drive shaft of the electric motor is connected via a transmission to the other end of the spindle. These components are enclosed within a housing of the tool. Operation of the tool is controlled through the use an operator actuated switch 14, such as a trigger switch, embedded in the handle of the tool. The switch 14 regulates current flow from the battery pack to the motor. The tool further includes an input port 16 configured to receive a connector from an AC adapter 17. The AC adapter 17 is external to the power tool and operates to provide a charging current for the battery pack 12. A visual indicator 18 may also be integrated into an external surface of the battery pack or the power tool housing to provide status of the charging process as further described below. Although a few primary components of the drill are described above, it is readily understood that other components readily known in the art may be needed to construct an operational drill.

Figure 2:
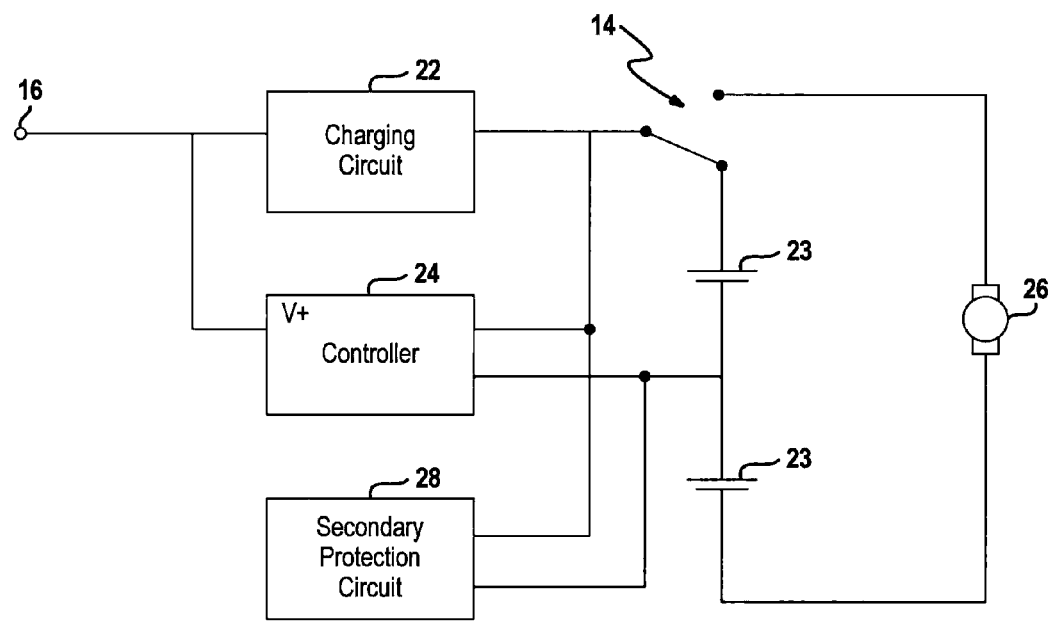
FIG. 2 is a block diagram depicting an exemplary control arrangement for the power tool.

A simplified diagram of the power tool 10 is further described in relation to FIG. 2. The power tool 10 includes a charging circuit 22 configured to receive a charging current from the input port 16 and deliver the charging current to one or more battery cells 23 residing in the battery pack 12. A charge control module 24 operates to monitor voltage of the battery cells 23 during charging and terminate the charging of the battery cells in accordance with the monitored voltages of the battery cells. An exemplary charge control scheme implemented by the charge control module 24 is further described below. It is noteworthy that the charge control module 24 does not receive power from the battery cells 23 but is only powered by the AC adapter. In this way, the charge control module 24 does not provide a drain on the battery cells.

The battery cells 23 are in turn operably coupled via the trigger switch 14 to the motor 26. The switch 14 regulates current flow from the battery cells 23 to the motor 26 in a manner readily known in the art. In one embodiment, the trigger switch 14 is disposed in the circuit path between the motor 26 and the battery cells 23. In other embodiments, the trigger switch 14 may be implemented as a single pole, double throw switch with one contact coupled to the motor 26 and the other contact coupled to the charging circuit 22 (as shown in the figure). When the trigger switch 14 is pulled, the switch 14 is coupled to the motor 26. Even when the AC adapter 17 remains plugged into the tool 10, the switch 14 operates to disconnect the battery cells 23 from the charging circuit 22. Although discharge control circuitry may be employed in some embodiments, it is noteworthy that the motor 26 is preferably coupled to the battery cells 23 without the use of any discharge control circuitry.

In an exemplary embodiment, two lithium-ion battery cells 23 are connected in series although other lithium-based chemistries, such as lithium metal or lithium polymer, are also contemplated by this disclosure. Likewise, more or less cells may be used by the tool. While the concepts disclosed herein are particularly applicable to lithium chemistry cells, it is understood that these concepts are extendable to other types of rechargeable battery cells.

In one embodiment, the battery cells 23 include an electrolyte composition comprised of a redox shuttle material. The term "redox shuttle" is readily understood to refer to a material that can provide oxidizable and reducible charge-transporting species that repeatably transport charge between the negative and positive terminals of a cell once the state of charge of the cell reaches a desired value, typically corresponding to the cell being fully charged. Further details regarding exemplary redox shuttle materials may be found in U.S. Patent Application Publication Nos. 2005/0221168 and 2010/0026240 which are incorporated by reference herein. In combination with other tool components, the use of the redox shuttle material reduces or eliminates the need for expensive charge and discharge control measures. In addition, the power tool 10 can be configured to receive a charging current from a conventional AC adapter 17 disposed external to the power tool 10, thereby further reducing the cost of the tool 10.

The power tool 10 may further include a secondary protection circuit 28. The secondary protection circuit 28 is configured to monitor voltage of one or more of the battery cells and operates to terminate charging of the battery cells when voltage of at least one of the battery cells exceeds a threshold. Thus, the secondary protection circuit 28 provides a failsafe mechanism for the controller.

Figure 3:
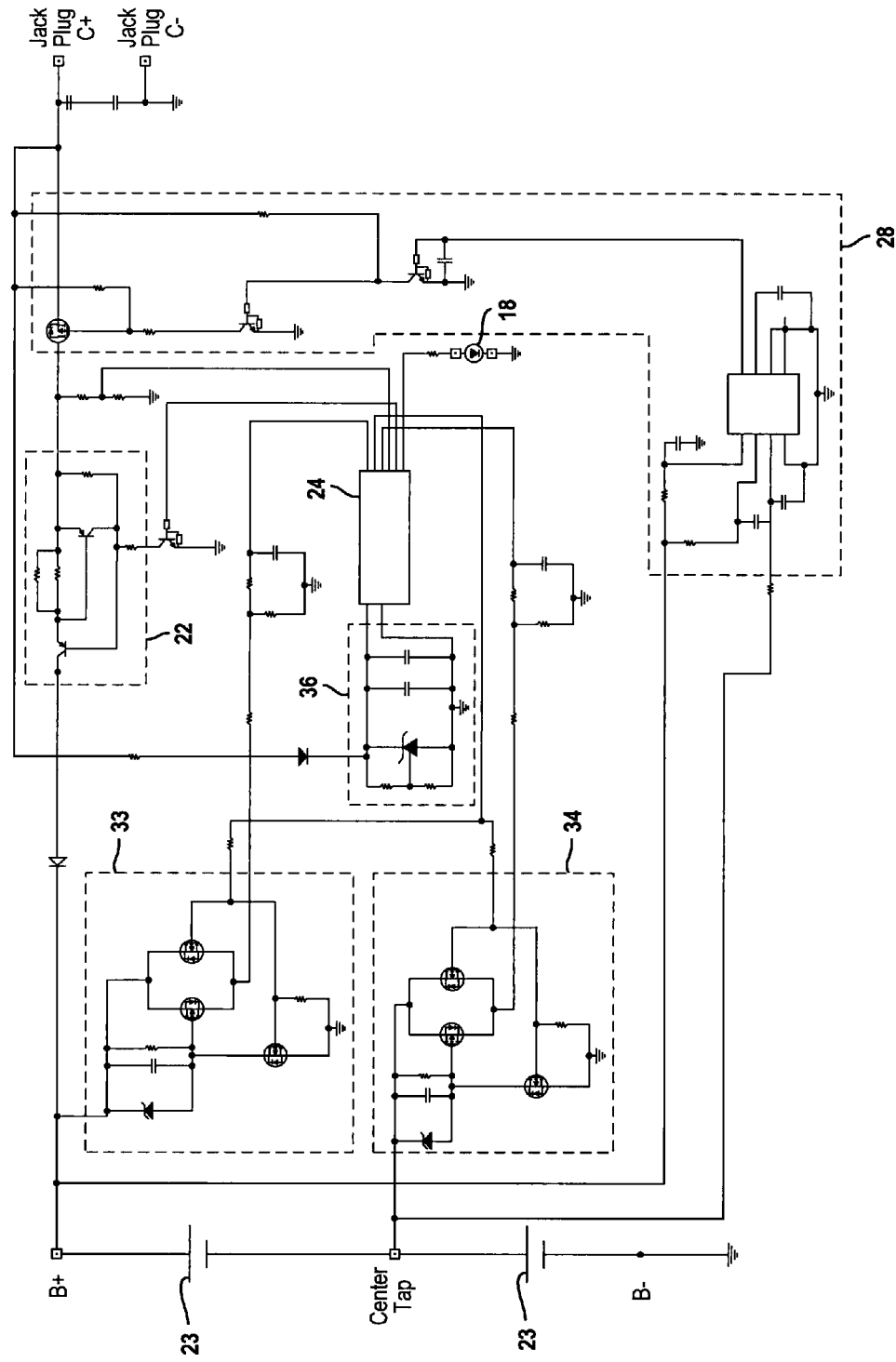
FIG. 3 is a schematic further depicting the control arrangement in accordance with a first exemplary embodiment.

FIG. 3 depicts a first exemplary embodiment of the power tool. The charging circuit 22 functions to regulate the charging current received from the AC adapter. In the exemplary embodiment, the charging circuit supplies a constant charging current on the order of 120 mA. Of further note, the charging circuit 22 includes a primary charge control switch Q2. The primary charge control switch Q2 is controlled by the charger control module 24 and may be place in an open state when charging is complete as further described below. Other circuit arrangements are contemplated by this disclosure.

The charger control module 24 is responsible for charging the battery cells and monitoring any fault conditions which may develop during charging. In the exemplary embodiment, the charger control module 24 receives input from two voltage detection circuits 33, 34; one for each battery cell. These inputs enable the charger control module 24 to monitor voltage of each battery cell. Alternatively, the charger control module 24 may be configured to monitor only the voltage across the entire stack of battery cells or some subset of cells therein.

The power tool may optionally include a secondary protection circuit 28. In this exemplary embodiment, the secondary protection circuit 28 is implemented primarily by the S-8244 battery protection IC commercially available from Seiko Instruments. The integrated circuit is configured to monitor voltage of one or more of the battery cells and output a disable signal when the voltages exceed some threshold. In this embodiment, a switch Q1 is interposed between the charging circuit 22 and the AC adapter 17. When the monitored cell voltages exceed the thresholds, the disable signal operates to open the switch Q1 and thereby terminate further charging of the battery cells by the AC adapter 17. Integrated circuits having such battery protection features are commercially available from various manufactures. In addition, other implementations for the secondary protection circuit also fall within the scope of this disclosure.

During the charging process, the charger control module 24 provides an output signal to an LED 18, thereby providing a status of the charging process to the tool operator. For example, the LED 18 may be turned on and off at a slow rate to indicate that the battery is being charged, the LED may remain on when the battery is fully charged and the LED may be turned on and off at a relatively faster rate to indicate a fault condition with the battery and/or the charging process. It is readily understood that other types of perceptible indicators and notification schemes fall within the scope of this disclosure.

In an exemplary embodiment, the charger control module 24 is implemented as software (processor-executable instructions) on a digital microcontroller 34. The charger control module 24 may be embodied in hardware or software as a digital microcontroller, a microprocessor or an analog circuit, a digital signal processor or by one or more digital ICs such as application specific integrated circuits (ASICs), for example. Again, it is noted that the power supply input pin (Vdd) of the microcontroller is powered, via a voltage regulating circuit 36, by power received from the AC adapter and not from the battery cells 23.

Figure 4:
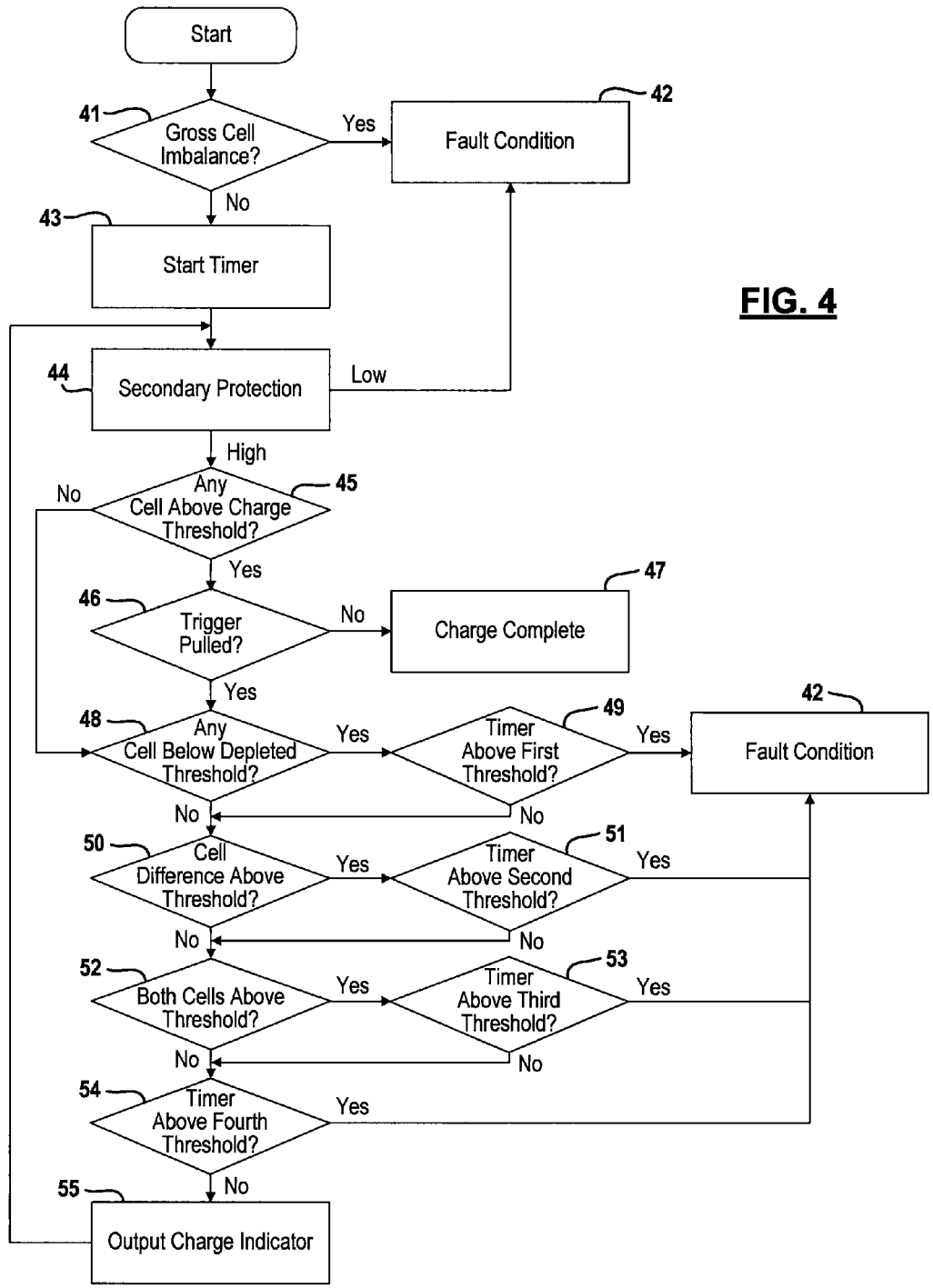
FIG. 4 is a flowchart illustrating an exemplary charging method employed by the power tool.

FIG. 4 illustrates an exemplary charging algorithm implemented by the charger control module 24. When the AC adapter is plugged into the power tool, a charging current is supplied to the battery cells 23. As noted above, the charger control module 24 monitors the voltages of each cell. Once any cell exceeds a fully charged threshold (e.g., 3.66 volts), the charging process is complete. Numerous exemplary threshold values are provided in relation to this charging algorithm. These values are presented only to describe one particular embodiment that has proven effective and should be viewed as illustrating, rather than limiting, the present disclosure.

It is conceivable the user may pull the trigger switch while the tool is plugged into the AC adapter. In this case, the detected cell voltage will appear to exceed the fully charged threshold and the charger control module 24 would incorrectly assume that the charging process is complete. To avoid this occurrence, the charger control module 24 further determines at 46 whether the trigger switch 14 is pulled. If not, charging process is correctly presumed complete as indicated at 47; otherwise process continues at 48.

During charging, the charger control module 24 initiates a timer at 43 and monitors for any fault conditions which may occur. First, the two battery cells are compared to each other at 41 to determine if there is a gross imbalance between the two cells. In one embodiment, a fault condition is presumed if the difference between the two cell voltages exceeds some threshold (e.g., 3.2 volts). Upon detecting a fault condition, the charger control module 24 initiates a fault handling procedure at 42. For example, the charger control module 24 provides the user a perceptible indicia of the fault condition, e.g., blinking the LED at a fast rate. The charger control module 24 may further operate to open a primary charge control switch Q2 and thereby interrupt the supply of current by the AC adapter to the battery cells.

The charger control module 24 may also perform other checks during the charging process. For example, the charger control module 24 may monitor the current supply at 44 along the circuit path at a point after the switch Q1 controlled by the secondary protection circuit 28. When the voltage on the sense line is high, current is being supplied to the battery cells. When the secondary protection circuit 28 detects a fault condition, the current is interrupted and the voltage on the sense line is low. In this case, the charger control module 24 initiates the fault handling procedure at 42.

The charger control module 24 further monitors whether any cell is below a cell depleted threshold at 48. When one or more of the cells are below the cell depleted threshold (e.g., 0.5 volts), the timer is checked at 49 against a first timer threshold (e.g., 6 minutes). The charger control module 24 initiates the fault handling procedure at 42 if one or more of the cells remain depleted and the timer exceeds the threshold; otherwise, processing continues at 50.

Likewise, the charger control module 24 continues to monitor the voltage difference between battery cells at 50. When the voltage difference exceeds a difference threshold (e.g., 2 volts), the timer is checked at 51 against a second timer threshold (e.g., 30 minutes). The charger control module 24 initiates the fault handling procedure at 42 if the voltage difference between two cells exceeds the threshold and the timer exceeds the threshold; otherwise, processing continues at 52.

The charger control module 24 may also detect if one or more cells are failing to be charged at 52. When one or more cells remain below a voltage charging threshold (e.g., 2.5 volts), the timer is checked at 51 against a third timer threshold (e.g., 60 minutes). The charger control module 24 initiates the fault handling procedure at 42 if one or more of the cells have not exceeded the threshold and the timer exceeds the threshold; otherwise, processing continues at 54.

Lastly, the charger control module 24 may detect at 54 if the cells have failed to reach a fully charged state with a certain time limit. When the charging process has not terminated after a certain time, e.g., 14 hours, the charger control module 24 initiates the fault handling procedure at 42; otherwise, processing charging process continues at 55. In this case, the charger control module 24 provides the user a perceptible indicia that the battery cells are being charged, e.g., blinking the LED at a relatively slow rate and the process is repeated until either the cells are fully charged or a fault condition occurs. Other types of charging schemes are contemplated within the broader aspects of this disclosure.

Figure 5:
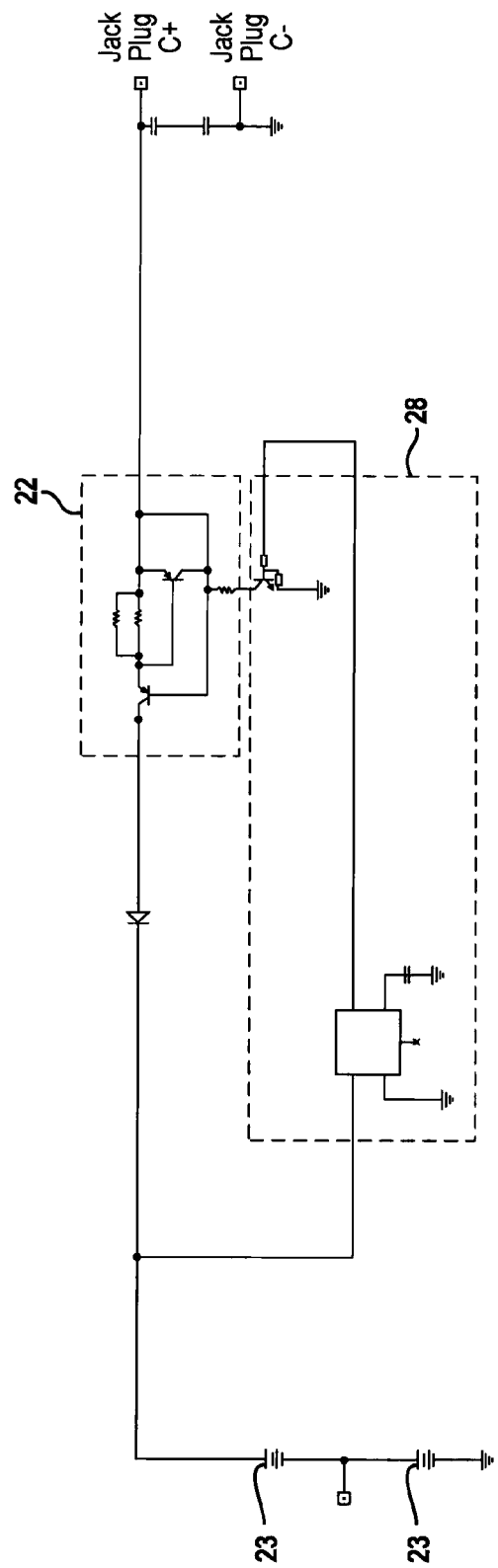
FIG. 5 is a schematic further depicting the control arrangement in accordance with a first exemplary embodiment.

In an alternate embodiment, the control scheme may be further simplified as shown in FIG. 5. More specifically, the charger control module 24 has been eliminated from the power tool 10. In this case, the secondary protection circuit 28 is configured the monitor the stack voltage across the two battery cells and output a disable signal when the voltage exceeds a predefined threshold. The disable signal in turn opens the charge switch Q2, thereby terminating further charging of the battery cells by the AC adapter. In this way, the secondary protection circuit serves as the primary overcharge protection mechanism for the tool.

In another embodiment, the power tool 10 may rely solely upon the redox shuttle material for controlling cell charging. In other words, the secondary protection circuit is also eliminated from the power tool, thereby further reducing the cost of the tool. In either case, the power tool 10 otherwise operates in the manner set forth above.

In any of these embodiments, the power input port 16 may be replaced with another type of port that enables the tool to receive power from an external power source. For example, the input port 16 may be implemented as a USB port. In this way, the tool 10 could be charged by connecting the power tool to a computer or some other device having a USB connection. Power received via the USB port would be received by the charging circuit 22 and otherwise used to supply current to the battery cells 23 of the tool in the manner set forth above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool having a motor, comprising:
two or more lithium-ion battery cells connected in series and operable to drive the motor, each of the battery cells having an anode, a cathode and an electrolyte composition of a redox shuttle material;
a charging circuit configured to receive a charging current from an AC adapter disposed external to the power tool and operates to supply the charging current to the battery cells;
a microcontroller configured to monitor voltage of the battery cells and operable to terminate charging of the battery cells in accordance with the monitored voltages of the battery cells, where the microcontroller receives power only from the AC adapter.

2. The power tool of claim 1 wherein the cathode is a lithium iron phosphate material.

3. The power tool of claim 1 wherein the motor is operably coupled to the battery cells without discharge control circuitry.

4. The power tool of claim 1 further comprises a secondary protection circuit configured to monitor voltage of each of the battery cells and operable to terminate charging of the battery cells when voltage of at least one of the battery cells exceeds a threshold.

5. The power tool of claim 4 further comprises a switch interposed between the charging circuit and the AC adapter, wherein the secondary protection circuit opens the switch when voltage of at least one of the battery cells exceeds a threshold.

6. The power tool of claim 1 wherein the microcontroller monitors voltage of each of the battery cells and terminates charging of the battery cells when voltage of one or more of the battery cells exceeds a fully charge threshold.

7. The power tool of claim 1 further comprises a user actuated switch disposed in a circuit path between the motor and the battery cells and operates to regulate the current flow from the battery cells to the motor, where the switch being a single pole, double throw with one contact coupled to the motor and another contact coupled to the charging circuit.

8. The power tool of claim 1 wherein the battery cells reside in a battery pack that is integrated into a housing of the power tool.

9. The power tool of claim 1 wherein the battery cells reside in a battery pack that detachably couples to a housing of the power tool.

10. A power tool having a motor, comprising:
two or more lithium-ion battery cells connected in series and operably coupled to the motor without discharge control circuitry, each of the battery cells having an anode, a cathode and an electrolyte composition of a redox shuttle material;

a charging circuit configured to receive a charging current from an AC adapter disposed external to the power tool and operates to supply the charging current to the battery cells;

a user actuated switch disposed in a circuit path between the motor and the battery cells that operates to regulate the current flow from the battery cells to the motor during discharge; and a charge protection circuit configured to monitor voltage of one or more the battery cells and operable to terminate charging of the battery cells when voltage of at least one of the battery cells exceeds a threshold.

11. The power tool of claim 10 wherein the cathode is a lithium iron phosphate material.

12. The power tool of claim 10 further comprises a switch interposed between the battery cells and the AC adapter, wherein the charge protection circuit opens the switch when voltage of at least one of the battery cells exceeds a threshold.

13. The power tool of claim 10 wherein the switch is a single pole, double throw with one contact coupled to the motor and another contact coupled to the charging circuit.

14. The power tool of claim 10 wherein the battery cells reside in a battery pack that is integrated into a housing of the power tool.

15. The power tool of claim 10 wherein the battery cells reside in a battery pack that detachably couples to a housing of the power tool.

16. A power tool having a motor, comprising:

two or more rechargeable battery cells connected in series and operably coupled to the motor without discharge control circuitry, each of the battery cells having an anode, a cathode and an electrolyte composition of a redox shuttle material;

a charging circuit configured to receive a charging current from an AC adapter disposed external to the power tool and operates to supply the charging current to the battery cells;

a user actuated switch disposed in a circuit path between the motor and the battery cells that operates to regulate the current flow from the battery cells to the motor during discharge; and a microcontroller configured to monitor voltage of the battery cells and operable to terminate charging of the battery cells in accordance with the monitored voltages of the battery cells, where the microcontroller receives power only from the AC adapter; and a secondary protection circuit configured to monitor voltage of each of the battery cells and operable to terminate charging of the battery cells when voltage of at least one of the battery cells exceeds a threshold.

* * * * *